United States Patent [19]

Denniston et al.

[11] 3,922,617

[45] Nov. 25, 1975

[54] ADAPTIVE FEED FORWARD SYSTEM

[75] Inventors: William B. Denniston, Bellmore; Robert F. Hertz, Kings Park, both of N.Y.

[73] Assignee: Cutler-Hammer, Inc., Milwaukee, Wis.

[22] Filed: Nov. 18, 1974

[21] Appl. No.: 524,680

[52] U.S. Cl. ................ 330/149; 328/162; 330/151
[51] Int. Cl.$^2$ ........................................... H03F 1/32
[58] Field of Search ...... 330/52, 149, 151; 328/162, 328/163; 333/16; 325/65, 472, 474, 475, 476, 479, 481

[56] References Cited

OTHER PUBLICATIONS

Seidel, "A Microwave Feed-Forward Experiment," *The Bell System Technical Journal*, Vol. 50, No. 9, Nov. 1971, pp. 2870–2916.

*Primary Examiner*—James B. Mullins
*Attorney, Agent, or Firm*—Henry Huff; Kevin Redmond

[57] ABSTRACT

A feed forward system for reducing the distortion products from a device such as an amplifier, wherein a sample of the device input signal is subtractively combined with a sample of the device output signal to produce a sample of the distortion products. The distortion sample is adjusted in phase and amplitude and subtractively combined with the device output to produce a distortion-reduced system output. First and second pilot signals, applied to the device input and output respectively, are detected in the sample of the distortion products and in the system output to produce control signals which adjust the phase and amplitude of the input signal sample and the distortion sample to provide an adaptive system which automatically compensates for uncontrolled variations in the system components. A portion of the distortion sample produced by the feed forward process is fed back to the device input by way of a negative feedback circuit to reduce the signal handling capacity required of components such as an auxiliary amplifier used in processing the distortion sample.

5 Claims, 1 Drawing Figure

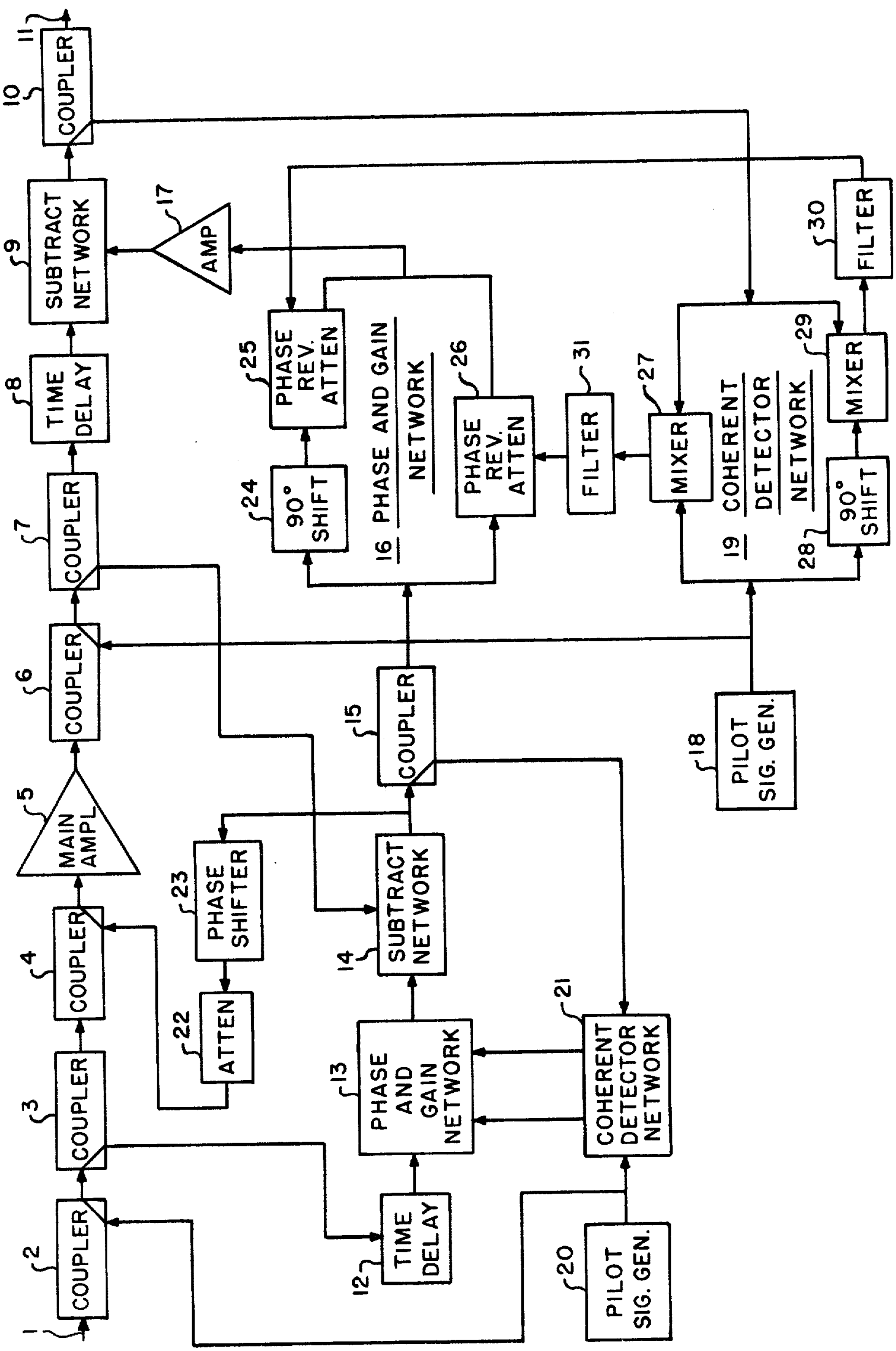
COUPLER
COUPLER
COUPLER
MAIN AMPL
COUPLER
COUPLER
TIME DELAY
SUBTRACT NETWORK
COUPLER
AMP
ATTEN
PHASE SHIFTER
TIME DELAY
PHASE AND GAIN NETWORK
SUBTRACT NETWORK
COUPLER
COHERENT DETECTOR NETWORK
PILOT SIG. GEN.
90° SHIFT
PHASE REV. ATTEN
PHASE AND GAIN NETWORK
PHASE REV. ATTEN
FILTER
MIXER
COHERENT DETECTOR NETWORK
90° SHIFT
MIXER
FILTER
PILOT SIG. GEN.

ADAPTIVE FEED FORWARD SYSTEM

BACKGROUND

1. Field

This invention pertains to improvements in feed forward circuitry used to reduce distortion products in electrical devices such as amplifiers.

2. Prior Art

Negative feedback has long been used to reduce distortion products generated in amplifiers; however, instability, reduced gain, and time delay problems limit its application. The instability and reduced gain may be overcome by feeding back only the distortion products as described in U.S. Pat. No. 3,825,854; however, the method described in this patent is intended for low frequency applications and does not take into account RF design considerations such as time delay and drift. The time delay problem associated with feedback can be overcome by feed forward as described in U.S. Pat. No. 1,686,792.

In a basic feed forward system, a sample of the input and output signals of a main amplifier are adjusted in phase and amplitude and subtractively combined in a first subtraction network to produce a sample of the distortion products. This distortion sample is adjusted in phase and amplitude and subtractively combined in a second subtraction network with the output of the main amplifier to cancel its distortion products. In a typical feed forward system the distortion products are amplified in an auxiliary amplifier and the time delays through the main and auxiliary amplifiers are compensated by placing time delay networks in the line carrying the input signal sample and in the line carrying the main amplifier output signal.

Although the basic feed forward system does take into account time delay, it is not capable of automatically adapting the system to compensate for uncontrolled component variations such as drift which can necessitate changes in the phase and gain settings required to maintain cancellation.

A feed forward system described by Seidel in the Bell System Technical Journal, Volume 50, Number 9, November, 1971 does contain compensating circuitry. In the Seidel system, a pilot signal is supplied to a coherent detector network and to the output of main amplifier. The outputs of the main and auxiliary amplifier are alternately sampled by means of a switch and supplied to the coherent detector network. The coherent detector network develops control signals which are passed to a motor driven phase shifter and a motor driven attenuator in the input line of the auxiliary amplifier.

The pilot signal simulates a distortion product because it is present in the output of the main amplifier, but not in its input. In the subtraction of the input and output signal samples, the pilot signal is not cancelled and appears in the output of the first subtraction network along with the sample of the distortion products. Consequently, the pilot signal is present in the outputs of the main and auxiliary amplifiers and at both inputs of the switch. The pilot signals sampled by the switch are compared in the coherent detector network to the pilot signal received directly from the signal generator to produce the phase and amplitude control signals for the motor driven phase shifter and attenuator and thereby adjust the distortion sample as necessary to compensate for uncontrolled component variation.

The Seidel system is a definite improvement over the basic feed forward system, but it has several disadvantages. Its switch sampling method is complicated and only monitors performance at points within the system rather than at the system output. Uncontrolled variations which could occur in the system components between the monitoring points and the output go undetected. The main amplifier in the Seidel system is designed for class A operation and therefore no attempt is made to compensate for overdrive, which can cause the main amplifier to saturate, reducing its gain and changing its time delay. The ability to compensate for overdrive is desirable as it makes possible the higher power handling capability associated with class C operation.

Practical overdrive compensation is difficult to achieve especially with prior art techniques because the compensation circuitry must operate with a rapidity comparable to that of the changes due to overdrive, and the distortion products must be reduced at the output of the main amplifier to prevent overdrive of the auxiliary amplifier.

SUMMARY

In the present invention, the pilot signal is detected at the system output to reduce complexity and provides a means of more directly monitoring overall system performance. Detection at the output avoids the additional circuitry used in prior art systems to detect the pilot at two points.

In this invention, a second pilot signal, applied to the input of the main amplifier and detected at the output of the first subtraction network, controls the phase and amplitude of the input signal sample with a response that is sufficiently rapid to compensate for overdrive of the main amplifier.

A portion of the output from the first subtraction network is fed back to the input of the main amplifier, reducing the distortion in the output of the main amplifier and thus the signal level applied to the auxiliary amplifier. There is no sacrifice in gain caused by this type of feedback. Only distortion products are fed back, leaving the amplification of the desired signal unaffected. By using a portion of the distortion sample which has been compensated for drift and time delay by the feed forward system, the drift and time delay problems normally associated with feedback circuits are eliminated. Although the feedback circuit generally cannot provide the complete reduction in the distortion products usually desired, a level of reduction is normally achieved which materially aids in keeping the signal handling capacity required of the auxiliary amplifier within reasonable bounds. The cooperation between the feed forward and feedback circuits make it feasible to operate the main amplifier in class C, and achieve the high efficiency available from this class of operation without the usual high level of distortion.

BRIEF DESCRIPTION OF THE DRAWING

The single FIGURE is a diagram of a preferred embodiment of the invention showing an adaptive feed forward system with a feedback circuit about the main amplifier and two automatically controlled phase and gain adjustment circuits.

DESCRIPTION OF THE PREFERRED EMBODIMENT

Referring to the drawing, the principal signal path from the system input at port 1 to the system output at port 11 is through couplers 2, 3 and 4, a main amplifier 5, couplers 6 and 7, a time delay 8, a subtraction network 9 and a coupler 10. The couplers shown in the drawing generally have one input and two output ports. A signal applied to the input port is passed virtually unattenuated to a main output port while only a small sample of the input signal is supplied to an auxiliary output port. The auxiliary port of the coupler 3, is connected to a subtraction network 14 by way of a time delay 12 and a phase and gain adjustment network 13. The auxiliary port of the coupler 7 is directly connected to the subtraction network 14.

The output of the subtraction network 14 is connected to the input of the main amplifier through a feedback circuit consisting of a phase shifter 23, an attenuator 22 and the coupler 4. The output of network 14 is also connected to the system output through a feed forward circuit consisting of a coupler 15, a phase and gain adjustment network 16, an auxiliary amplifier 17 and the subtraction network 9. Network 16 is comprised of a phase reversible attenuator 26 in parallel with a 90° phase shifter 24 and a phase reversible attenuator 25.

The output of a pilot signal generator 18 is connected to a coherent detector network 19 and also to the output line of the main amplifier 5 through the coupler 6. The auxiliary port of the coupler 10 is directly connected to the coherent detector network 19. The coherent detector network 19 comprises a mixer 27 connected in parallel with a 90° phase shifter 28 and a mixer 29. The outputs from mixers 27 and 29 are connected to phase reversible attenuators 26 and 25 through low pass filters 31 and 30 respectively.

A second pilot generator 20 is connected to a coherent detector 21 and to the input of the main amplifier through the coupler 2. The auxiliary port of coupler 15 is connected to the coherent detector network 21. The internal components and interconnections of network 13 and 21 are identical to those of 16 and 19 respectively.

In the operation of the system shown in the figure, a sample of the main amplifier output signal, containing a replica of the input signal and the distortion products of the main amplifier is obtained from the coupler 7. The input signal replica in the output sample is cancelled by adjusting, in the network 13, the phase and amplitude of an input signal sample obtained from coupler 3, to produce an output from the network 14 which is a sample of the distortion products only.

The sample of the distortion products is applied to the system output by way of the phase and gain adjustment network 16, the auxiliary amplifier 17 and the subtraction network 9. The distortion sample is adjusted in phase and amplitude in network 16 to cancel the distortion products in the system output.

The portion of the pilot signal from the pilot generator 18 which is applied to the output line of the main amplifier 5 is carried to both inputs of the subtraction network 9 and is cancelled in the system output by the same process that cancels the distortion products. When network 16 requires adjustment, a portion of the pilot signal appears in the system output and is detected by the coherent detector network 19. The outputs from network 19 are supplied to the phase and gain network 16 to make the required adjustments to maintain the cancellation of the pilot signal and the distortion products in the system output.

The signals used to adjust the attenuators in network 16 are produced in the coherent detector network 19 by mixing the pilot signal from the generator 18 with the pilot signal in the system output sample. The mixer outputs are dc signals under steady state conditions, but vary as the amplitudes and the relative phase of the input signals change. Signals at frequencies other than the pilot frequency in the system output produce mixer products which vary at a higher rate of frequency than those produced by the pilot signal. These higher frequency products are eliminated from the mixer outputs by low pass filters 30 and 31.

The signal passing through attenuator 25 in the network 16 is in quadrature with the signal through attenuator 26 by virtue of the phase shifter 24. The control signals from the mixers in network 19 adjust the amplitude or reverse the phase of these quadrature signals to produce an output from network 16 at any desired attenuation or phase angle.

Both mixers in network 19 produce output signals when a pilot is present in the system output but the output from mixer 29 differs from that of mixer 27 because of 90° phase shifter 28. The components of the pilot signal in the system output that are in quadrature with the pilot signal from generator 18 are detected in mixer 29, while those components that are inphase are detected in mixer 27. As the output from mixer 27 increases, indicating an increase in the inphase pilot signal content in the system output, the attenuation through attenuator 26 is reduced, supplying a greater proportion of the inphase pilot signal to the subtraction network 9 to cancel the inphase component in the system output. A similar compensating operation is carried out for the pilot signal components in quadrature by mixer 29 and attenuator 25. It is assumed here that the pilot signals supplied to coherent detector network 19 have a phase relationship which will produce the correct polarity control signals for network 16 and that the amplitudes of the control signals are appropriate to drive the attenuators; however, if these conditions are not met by the circuit as originally constituted, they can be produced by the installation of a time delay network in the line from coupler 10 to network 19 and by a network in the output of each mixer to match its output characteristics with the control characteristics of the attenuators.

In the present invention, detection of a pilot at a single point is used in a second application in the system. The input signal cancellation process in network 14 is monitored and controlled by a second pilot signal from generator 20 in a manner similar to that described for controlling the cancellation of the distortion products in subtraction network 9. The second pilot signal is applied to the input of the main amplifier 5 through the coupler 2. This pilot signal and its amplified replica are supplied to and cancelled in the subtraction network 14 in the same way as a desired input signal. The pilot signal is present in the output of the subtraction network 14 only when an adjustment of the phase and gain network 13 is required. It is then detected in coherent detector network 21 and used to make the required adjustments in the network 13. The operation of the coherent detector network 21 and the phase and gain adjustment network 13 are identical to that of networks 19 and 16 described supra.

The phase and gain adjustment network 13 can compensate for changes in the phase and gain of a class C main amplifier caused by changes in input level, provided its response is sufficiently rapid to follow the changes. Previously used motor driven devices intended to compensate for drift do not have the required response. The phase and gain network 13 is designed to have a rapid response capability. The only active components in network 13 are the phase reversible attenuators, which can be made to have a bandwidth exceeding 1 GHz. To achieve an overall rapid system response, the coherent detector network must have a response comparable to that of the phase and gain adjustment network. Fortunately, identical components can be used in both networks. It can be seen in the drawing that the configuration and components of coherent detector network 19 are similar to those of the phase and gain adjustment network 16. Although the devices identified by drawing numbers 27 and 29 are mixers rather than phase reversible attenuators, a doubly balanced mixer, shown in FIG. 2 of U.S. Pat. No. 3,696,429, may serve as either a mixer or a phase reversible attenuator, thereby making it possible to use identical components and achieve comparable response times.

The feedback circuit about the main amplifier 5 also aids in making class C operation of the main amplifier possible by reducing the signal handling capacity required for the auxiliary amplifier. This circuit comprises the coupler 7, the subtraction network 14, the phase shifter 23, the attenuator 22 and the coupler 4. The distortion products from the subtraction network 14 are adjusted in phase and amplitude in the phase shifter 23 and the attenuator 22 to oppose the distortion products in the output of the main amplifier 5. By feeding back only the distortion products from subtraction network 9 to the input of the main amplifier 5, the gain of the amplifier for the desired signal is left unaffected.

Although the feedback circuit cannot completely attenuate the distortion products of the main amplifier because of the time delay through the amplifier and the feedback circuit, it can attenuate those products which are continuous in nature and remain present for a period longer than the time delay through the amplifier and feedback circuit. The main amplifier may be broadbanded to reduce delay time without incurring the stability problems of conventional feedback circuits because the desired signal from the amplifier output is effectively isolated from its input by the subtraction network 14.

Distortion feedback circuitry which has been designed for low frequency operation will not operate satisfactorily at RF frequencies because the input signal sample is not adjusted in phase or amplitude to compensate for time delay, drift or overdrive. Without this compensation, the desired signal is fed back to the input in addition to the distortion product, destroying the advantage this circuit provides over standard negative feedback circuits. The necessary compensation is obtained at no appreciable increase in cost in the present invention as it is an integral part of the feed forward system and can be used to serve the feedback and the feed forward circuits simultaneously.

The operation of the feed forward and feedback circuits are interdependent. The feedback circuit aids in making class C operation of the main amplifier practical, while the feed forward system automatically provides the compensated feedback signal necessary for the operation of the feedback circuit. These circuits, therefore, assist in each others internal operation as well as combine to reduce the distortion in the overall system output.

We claim:

1. An adaptive feed forward system of the type designed to reduce the distortion from a device such as an amplifier, including means for extracting a sample of the distortion products from the output of said device, adjustable means for equalizing said sample and the products remaining in the output after extracting the sample, means for subtractively combining said equalized sample and remaining products to produce a distortion-reduced system output, and means including pilot signal generator and coherent detector means for automatically adjusting said equalizing means to compensate for uncontrolled variations in the system components, wherein the improvement comprises:

a. means for extracting a sample of the system output, and b. means for applying said sample of the system output to said coherent detector means.

2. An adaptive feed forward system as claimed in claim 1, wherein said means for extracting a sample of the distortion products includes adjustable means for equalizing a desired input signal and its replica in samples of the input and output signals of said device, means for subtractively combining said input and output samples, and second pilot signal generator and coherent detector means for automatically adjusting said means for equalizing the desired signal and its replica to automatically compensate for uncontrolled variation in the system components, wherein the improvement comprises:

a. means for extracting a portion of the distortion products sample, and b. means for applying said portion of the distortion products sample to said second coherent detector means.

3. An adaptive feed forward system as claimed in claim 2, further comprising:

a. means for feeding back a portion of said sample of the distortion products to the input of said device, and b. means for adjusting the phase and amplitude of said feedback sample to oppose and thereby reduce the distortion products in the output of said device.

4. An adaptive feed forward method of the type designed to reduce the distortion from a device such as an amplifier, including the steps of extracting a sample of the distortion products from the output of said device, equalizing said sample and the distortion products remaining in the output after extracting sample, subtractively combining said equalized sample and remaining products to produce a distortion-reduced system output, adding a pilot signal to the output of said device, detecting said pilot signal coherently, and adjusting the equalizing of said sample and said products in response to the detected pilot signal to automatically compensate for uncontrolled variation in the system components, wherein the improvement comprises the steps of:

a. extracting a sample of the system output, and b. coherently detecting the pilot signal in said sample of the system output.

5. An adaptive feed forward method as described in claim 4, further comprising the steps of:

a. feeding back a portion of said sample of the distortion products to the input of said device, and b. adjusting the phase and amplitude of said feedback sample to oppose and thereby reduce the distortion products in the output of said device.

* * * * *